United States Patent
Chen et al.

(10) Patent No.: US 9,958,717 B1
(45) Date of Patent: May 1, 2018

(54) METHOD OF ADJUSTING DISPLAY SIZE

(71) Applicant: Shenzhen China Star Optoelectronics Technology Co., Ltd., Shenzhen, Guangdong (CN)

(72) Inventors: Jie Chen, Guangdong (CN); Dike Shan, Guangdong (CN); Shih-ying Sun, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 191 days.

(21) Appl. No.: 15/106,674

(22) PCT Filed: Apr. 29, 2016

(86) PCT No.: PCT/CN2016/080808
§ 371 (c)(1),
(2) Date: Jun. 20, 2016

(87) PCT Pub. No.: WO2017/147996
PCT Pub. Date: Sep. 8, 2017

(30) Foreign Application Priority Data

Mar. 2, 2016 (CN) .......................... 2016 1 0119270

(51) Int. Cl.
*G02F 1/1333* (2006.01)
*G02F 1/1339* (2006.01)

(52) U.S. Cl.
CPC ...... *G02F 1/133308* (2013.01); *G02F 1/1339* (2013.01); *G02F 2001/133325* (2013.01)

(58) Field of Classification Search
CPC ............. G02F 1/1333; G02F 1/133308; G02F 2001/133325; G02F 1/1339
See application file for complete search history.

(56) References Cited

U.S. PATENT DOCUMENTS

2002/0054266 A1* 5/2002 Nishimura ............ G02F 1/1345
349/149
2002/0118335 A1 8/2002 Tannas
(Continued)

FOREIGN PATENT DOCUMENTS

| CN | 1343542 A | 4/2002 |
| CN | 2906677 Y | 5/2007 |

(Continued)

*Primary Examiner* — Jia Pan
(74) *Attorney, Agent, or Firm* — Andrew C. Cheng

(57) ABSTRACT

Disclosed is a method of adjusting a display size, comprising steps of: providing a display, including a first substrate, a second substrate and an image generating medium; locating first and second cutting lines on the first and second substrates, and an orthographic projection of the first cutting line on the second substrate does not overlap with the second cutting line; cutting the first substrate and the image generating medium along the first cutting line to form a first reservation part and a part of the image generating medium corresponding thereto, and cutting the second substrate along the second cutting line to form a second reservation part, and the second reservation part protrudes relative to the first reservation part to form a protruding part; adding adhesive on the protruding part to make the adhesive permeate between the first reservation part and the second reservation part to solidify the adhesive.

20 Claims, 3 Drawing Sheets

(56) References Cited

U.S. PATENT DOCUMENTS

| | | | | |
|---|---|---|---|---|
| 2003/0184704 A1* | 10/2003 | Akiyama | .......... | G02F 1/133305 |
| | | | | 349/158 |
| 2004/0245913 A1* | 12/2004 | Wakayama | .......... | B28D 5/0011 |
| | | | | 313/493 |
| 2006/0023155 A1* | 2/2006 | Magana | ............ | G02F 1/133351 |
| | | | | 349/154 |
| 2009/0213319 A1* | 8/2009 | Sasaki | ................... | G02F 1/1303 |
| | | | | 349/189 |
| 2014/0085579 A1* | 3/2014 | Fan | ....................... | G02F 1/1339 |
| | | | | 349/123 |

FOREIGN PATENT DOCUMENTS

| | | |
|---|---|---|
| CN | 1991478 A | 7/2007 |
| CN | 101051137 A | 10/2007 |
| CN | 102621734 A | 8/2012 |
| CN | 104102051 A | 10/2014 |

\* cited by examiner

… (1) …

METHOD OF ADJUSTING DISPLAY SIZE

CROSS REFERENCE

This application claims the priority of Chinese Patent Application No. 201610119270.3, entitled "Method of adjusting display size", filed on Mar. 2, 2016, the disclosure of which is incorporated herein by reference in its entirety.

FIELD OF THE INVENTION

The present application relates to a display technology field, and more particularly to a method of adjusting display size.

BACKGROUND OF THE INVENTION

The display is usually to show the text or the image. With the constant development of the display technology, the displays have applications in many fields. In the respective specific applications, the various specific performance properties of the displays are necessary. Thus, the various specific applications in kinds of fields require the displays of different sizes. In case that the display has to be designed independently for every size, the design cost and the production cost will be higher. From an economic point of view, the maker provides the universal design solution as producing the displays so that all the displays have the properties which are basically the same and the unified size specification. Then, while producing the displays of other specification in a small amount, these sizes can be changed without additional design for decreasing the design cost. Besides, as the non circuit integration end of the display appears the poor display in the mass production, the end can be removed; in the check and test stage of the display, it is also required to cut the display for adjusting the size for adapting with the size of the test equipment.

In prior art, the display of certain size is generally manufactured in advance, and then it is cut to be the display of the required size. The adhesive is coated, and the adhesive is solidified, and then the related circuit is connected to accomplish the manufacture of the display of the required size.

The display generally comprises a first substrate and a second substrate. In the process of cutting the display according to prior art, after finishing cutting, the sections of the first substrate and the second substrate are aligned at the cutting position. Therefore, the adhesive can only be coated on the aligned sections of the first substrate and the second substrate. The phenomenon of the adhesive break and the large coating location deviation can easily happen as coating due to the contact area of the adhesive and the sections is too small or the sections are uneven. Accordingly, it leads to the poor seal between the first substrate and the second substrate.

SUMMARY OF THE INVENTION

An objective of the present application is to provide a method of adjusting a display size. The method can make the adhesive fully permeate between the first substrate and the second substrate of the display to prevent the poor seal issue caused by the large coating location deviation as coating the adhesive and the adhesive break.

For solving the aforesaid technical issue, the technical solution employed by the present application is:

The present application provides a method of adjusting a display size, and the method of adjusting the display size comprises steps of:

providing a display, and the display comprises a first substrate, a second substrate and an image generating medium between the first substrate and the second substrate;

locating a first cutting line on the first substrate, and locating a second cutting line on the second substrate, and an orthographic projection of the first cutting line on the second substrate does not overlap with the second cutting line;

cutting the first substrate and the image generating medium along the first cutting line to form a first reservation part and a part of the image generating medium corresponding to the first reservation part, and cutting the second substrate along the second cutting line to form a second reservation part stacked with the first reservation part, and an edge of the first reservation part at the first cutting line contract inwardly relative to an edge of the second reservation part at the second cutting line to form a protruding part at the edge of the second reservation part;

adding adhesive on a surface of the protruding part facing the first reservation part to make the adhesive permeate between the first reservation part and the second reservation part;

solidifying the adhesive.

The step of making the adhesive permeate between the first reservation part and the second reservation part comprises:

an edge of the adhesive permeating between the first reservation part and the second reservation part is distanced at least 0.1 millimeter from the edge of the first reservation part at the first cutting line.

A distance that the edge of the first reservation part at the first cutting line contract inwardly relative to the edge of the second reservation part at the second cutting line is in a range of 1 millimeter to 10 millimeter.

The step of adding adhesive on a surface of the protruding part facing the first reservation part to make the adhesive permeate between the first reservation part and the second reservation part comprises:

adding the adhesive on the surface of the protruding part facing the first reservation part along the edge of the first reservation part at the first cutting line;

increasing pressure on a surface of the adhesive to make the adhesive permeate between the first reservation part and the second reservation part.

The step of solidifying the adhesive can comprise:

employing ultraviolet light to irradiate the adhesive to solidify the adhesive, wherein the adhesive is a light curing adhesive.

The step of solidifying the adhesive can comprise:

heating the adhesive to solidify the adhesive, wherein the adhesive is a heat curing adhesive.

The first substrate is a thin film transistor array substrate, and the second substrate is a color filter component.

The first substrate is a color filter component, and the second substrate is a thin film transistor array substrate.

The image generating medium is liquid crystal.

Compared with prior art, the technical solution of the present application at least possesses benefits below:

In the technical solution of the present application, and in the utilized method of adjusting the display size, because the orthographic projection of the first cutting line on the second substrate does not overlap with the second cutting line, and the first substrate and the image generating medium are cut along the first cutting line to remove the first remove part and the part of the image generating medium corresponding to the first remove part to form the first reservation part and a part of the image generating medium, and the second substrate is cut along the second cutting line to remove the second remove part to form the second reservation part, and an edge of the first reservation part at the first cutting line contract inwardly relative to an edge of the second reservation part at the second cutting line so that the second reservation part protrudes with a part to form a protruding part;

i.e. after the display is cut, the length of the second reservation part is larger than the length of the first reservation part, and after cutting, the length of the second substrate is larger than the length of the first substrate, and thus the protruding part is formed on the second reservation part;

Thus, the adhesive can be added on the surface of the protruding part facing the first reservation part. Because the protruding part and the second reservation part are at the same plane, the adhesive added on the surface of the protruding part facing the first reservation part can easily permeate between the first reservation part and the second reservation part. Thereby, the adhesive can fully permeate between the first reservation part and the second reservation part to make the full seal between the first reservation part and the second reservation part, and thus to avoid the phenomenon of the large coating location deviation and the adhesive break for preventing the poor seal issue caused by the large coating location deviation and the adhesive break.

BRIEF DESCRIPTION OF THE DRAWINGS

In order to more clearly illustrate the embodiments of the present application or prior art, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Figure 1:
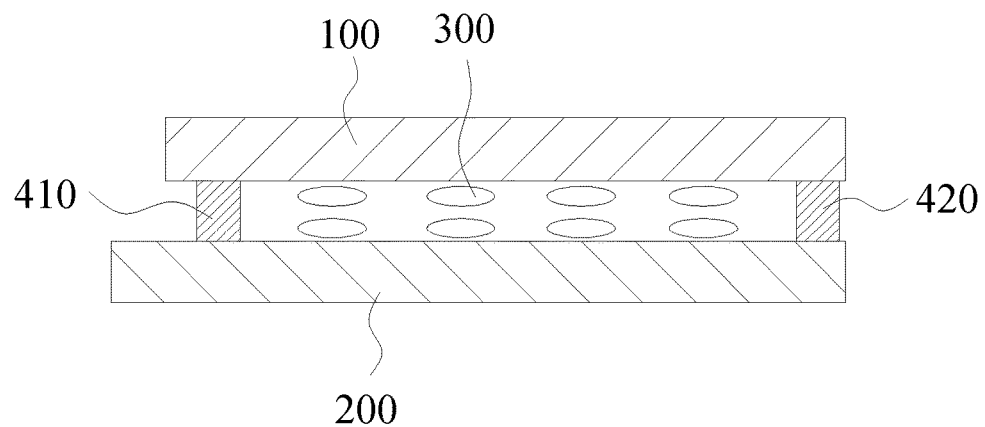
FIG. 1 is a diagram of a stacking structure of a display in the step S1 in the embodiment of the present application.

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts obtained, should all be considered within the scope of protection of the present application.

Besides, the following descriptions for the respective embodiments are specific embodiments capable of being implemented for illustrations of the present application with referring to appended figures. For example, the terms of up, down, front, rear, left, right, interior, exterior, side, etcetera are merely directions of referring to appended figures. Therefore, the wordings of directions are employed for explaining and understanding the present application but not limitations thereto.

In the description of the application, which needs explanation is that the term "installation", "connected", "connection" should be broadly understood unless those are clearly defined and limited, otherwise, For example, those can be a fixed connection, a detachable connection, or an integral connection; those can be a mechanical connection, or an electrical connection; those can be a direct connection, or an indirect connection with an intermediary, which may be an internal connection of two elements. To those of ordinary skill in the art, the specific meaning of the above terminology in the present application can be understood in the specific circumstances.

Besides, in the description of the present application, unless with being indicated otherwise, "plurality" means two or more. In the present specification, the term "process" encompasses an independent process, as well as a process that cannot be clearly distinguished from another process but yet achieves the expected effect of the process of interest. Moreover, in the present specification, any numerical range expressed herein using "to" refers to a range including the numerical values before and after "to" as the minimum and maximum values, respectively. In figures, the same reference numbers will be used to refer to the same or like parts.

The present application provides a method of adjusting a display size so that the size of the display after adjustment is applicable for the corresponding usage. The display of the present application can include all displays in the display field. For convenience of understand and description, the liquid crystal display is illustrated for explanation in the embodiment of the present application.

In the embodiment of the present application, the method of adjusting the display size can comprises the following steps S1, S2, S3, S4 and S5. For convenience of description, the display manufactured according to the target size is named to be the target display, i.e. the display after cutting in the following description is the target display.

As related with the step 1, please refer to FIG. 1. FIG. 1 is a diagram of a stacking structure of a display in the step S1 in the embodiment of the present application.

Step S1: providing a display, and the display comprises a first substrate 100, a second substrate 200 and an image generating medium 300 between the first substrate 100 and the second substrate 200.

Specifically, the display of which the size is to be adjusted is prepared, first, wherein two opposite ends of the display are respectively sealed with a first seal part 410 and a second seal part 420. In the practical production, one end of the display further comprises a circuit board (not shown in figure) for electrical connection and drive display, such as a flexible circuit board. For convenience of description, the end of the display is named to be a circuit connection end in the present application, i.e. the left end in FIG. 1, and the opposite other end is a non circuit end, i.e. the right end in FIG. 1.

In the process of adjusting the size of the display, for not influencing the electrical performance of the circuit connection end, it is preferred to cut at the non circuit end to amend the size of the display to be the target size.

The thin film transistor liquid crystal display (TFT-LCD) is illustrated. The first substrate 100 can be a color filter component, and then the second substrate 200 can be a thin film transistor array substrate; it is understandable that the first substrate 100 can be the thin film transistor array substrate, and then the second substrate 200 can be the color filter component; and the image generating medium 300 between the first substrate 100 and the second substrate 200 can be liquid crystal.

Figure 2:
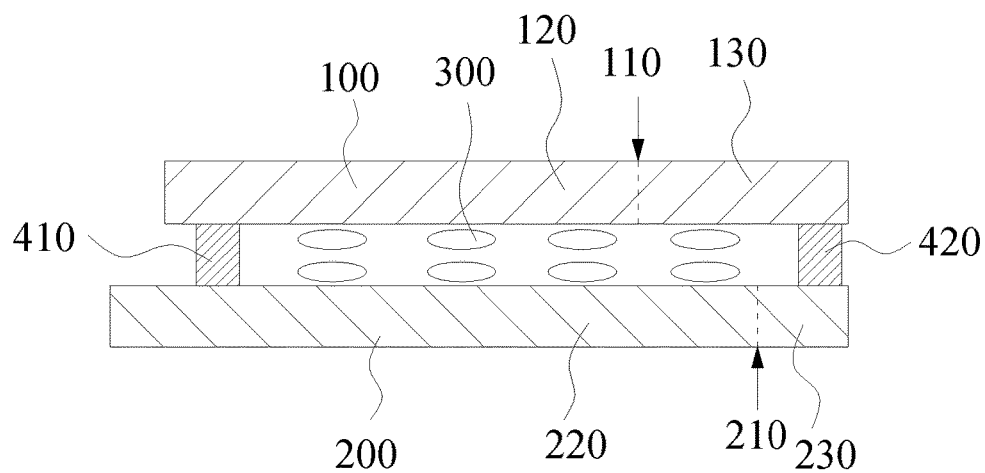
FIG. 2 is a diagram that the cutting line is located on the display in the step S2 in the embodiment of the present application.

As related with the step 2, please refer to FIG. 2. FIG. 2 is a diagram that the cutting line is located on the display in the step S2 in the embodiment of the present application.

Step S2: locating a first cutting line on the first substrate 100, and locating a second step cutting line on the second substrate 200, and an orthographic projection of the first cutting line on the second substrate does not overlap with the second cutting line.

Specifically, the first cutting line is located at the position 110 on the first substrate 100 to ensure the border between the first reservation part 120 and the first remove part 130, and the second cutting line is located at the position 210 on the second substrate 200 to ensure the border between the second reservation part 220 and the second remove part 230. Then, the first reservation part 120 and the second reservation part 220 are at the same end of the display, and the orthographic projection of the first cutting line on the second substrate 200 does not overlap with the second cutting line.

Specifically, the first reservation part 120 is the part of the first substrate 100 reserved for being one component of the target display in the following cutting process; the first remove part 130 is the part of the first substrate 100 to be removed in the following cutting process, and the part is not the component of the target display. Similarly, the second reservation part 220 is the part of the second substrate 200 reserved for being one component of the target display in the following cutting process; the second remove part 230 is the part of the second substrate 200 to be removed in the following cutting process, and the part is not the component of the target display.

In FIG. 2, the dot lines are respectively used to indicate the border between the first reservation part 120 and the first remove part 130, and the border between the second reservation part 220 and the second remove part 230.

Preferably, the first reservation part 120 and the second reservation part 220 are positioned at the circuit connection end. The orthographic projection of the first cutting line on the second substrate 200 does not overlap with the second cutting line, i.e. the sizes of the reservation part of the first substrate 100 and the reservation part of the second substrate 200 are different. In one embodiment, it is preferred that the size of the reservation part of the second substrate 200 is larger than the size of the reservation part of the first substrate 100.

Figure 3:
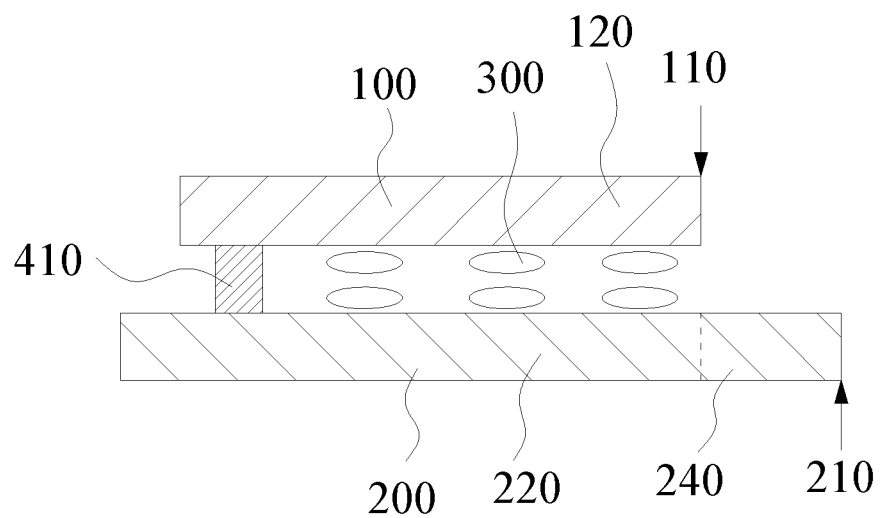
FIG. 3 is a structure diagram of the display in the step 3 in the embodiment of the present application.

As related with the step S3, and referring to FIG. 2 and FIG. 3, together, FIG. 3 is a structure diagram of the display after cutting the first remove part 130 and the second remove part 230 in the step 3 in the embodiment of the present application.

Step S3: cutting the first substrate 100 and the image generating medium 300 along the first cutting line to form a first reservation part 120 and a part of the image generating medium 300 corresponding to the first reservation part, and cutting the second substrate 200 along the second cutting line to form a second reservation part 220 stacked with the first reservation part 120, and an edge of the first reservation part 120 at the first cutting line contract inwardly relative to an edge of the second reservation part 220 at the second cutting line to form a protruding part 240 at the edge of the second reservation part 220.

Specifically, the first substrate 100 and the image generating medium 300 are cut along the first cutting line to remove the first remove part 130 and the part of the image generating medium 300 corresponding to the first remove part 130 to form the first reservation part 120 and a part of the image generating medium, and the second substrate 200 is cut along the second cutting line to remove the second remove part 230 to form the second reservation part 220, and an edge of the first reservation part 120 at the first cutting line contract inwardly relative to an edge of the second reservation part 220 at the first cutting line so that the second reservation part 220 protrudes relative to first reservation part 120 with a part to form a protruding part 240.

Specifically, the first substrate 100 and the image generating medium 300 corresponded with the first substrate 100 are cut at position 110 of the first substrate 100 along the first cutting line to remove the first remove part 130 and the part of the image generating medium 300 corresponding to the first remove part 130 to reduce the size of the substrate 100; the second substrate 200 is cut at position 210 of the second substrate 200 along the second cutting line to remove the second remove part 230 to reduce the size of the second substrate 200, which namely is: the second reservation part 220 protrudes relative to first reservation part 120 with a part to form a protruding part 240, that is: the first reservation part 120 and the second reservation part 220 form a step. Preferably, the protruding part 240 relative to a distance that an edge of the first reservation part 120 protrudes at the first cutting line can be 1 millimeter to 10 millimeter. Namely, a distance that the edge of the first reservation part 120 at the first cutting line contract inwardly relative to the edge of the second reservation part 220 at the second cutting line can be in a range of 1 millimeter to 10 millimeter. The cutting processes to the first substrate 100 and the second substrate 200 can be implemented at the same time. Or, the first substrate 100 can be cut, first, and then the second substrate 200 is cut. Or, the second substrate 200 can be cut, first, and then the first substrate 100 is cut.

The protruding part 240 is employed to carry the adhesive for coating the adhesive in the following.

Figure 4:
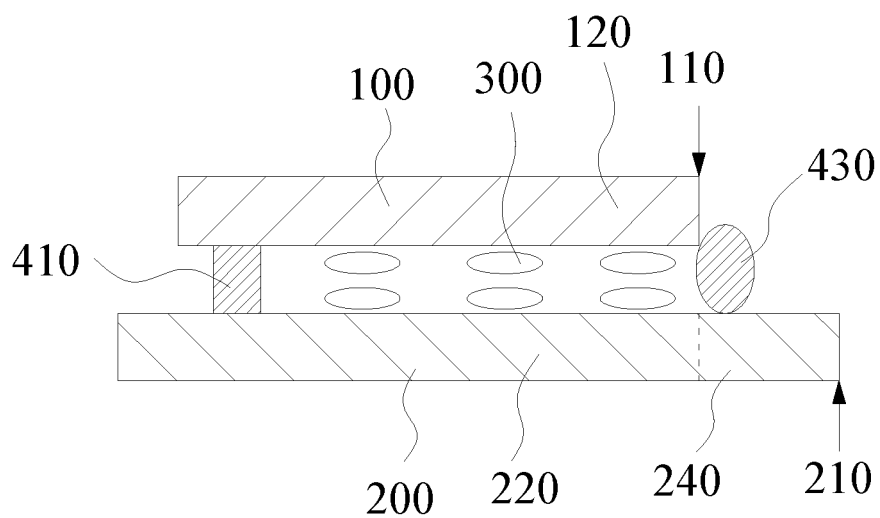
FIG. 4 is a diagram that the adhesive is added on the protruding part in the embodiment of the present application.

As related with the step 4, please refer to FIG. 4. FIG. 4 is a diagram that the adhesive is added on the protruding part in the embodiment of the present application.

Step S4: adding adhesive 430 on a surface of the protruding part 240 facing the first reservation part 120 to make the adhesive 430 permeate between the first reservation part 120 and the second reservation part 220 so that the adhesive 430 seals the gap between the first reservation part 120 and the second reservation part 220 and prevents the leakage of the image generating medium 300.

Specifically, the adhesive 430 is added on the surface of the protruding part 240 facing the first reservation part 120 along the edge of the first reservation part 120 at the first cutting line so that the adhesive 430 is close to the first reservation part 120.

In one embodiment, the pressure is increased on a surface of the adhesive 430 to make the adhesive 430 permeate between the first reservation part 120 and the second reservation part 220.

In another embodiment, the siphon principle is utilized to make the adhesive 430 fully permeate between the first reservation part 120 and the second reservation part 220.

Preferably, an edge of the adhesive 340 permeating between the first reservation part 120 and the second reservation part 220 is distanced at least 0.1 millimeter from the edge of the first reservation part 120 at the first cutting line.

Figure 5:
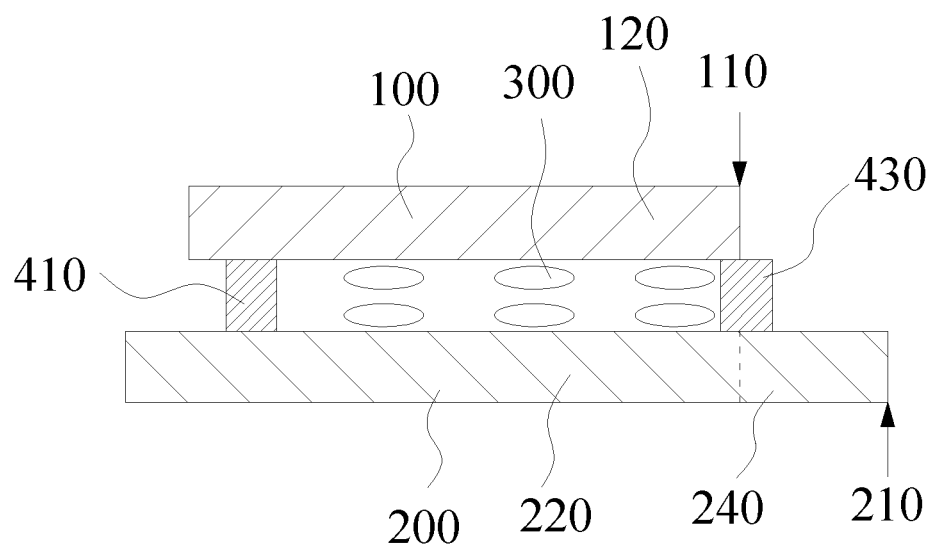
FIG. 5 is a structure diagram of the display after the adhesive is solidified in the embodiment of the present application.

As related with the step 5, please refer to FIG. 5. FIG. 5 is a structure diagram of the display after the adhesive is solidified in the embodiment of the present application.

Step S5: solidifying the adhesive 430.

In one embodiment, the ultraviolet light is employed to irradiate the adhesive 430 to solidify the adhesive 430, wherein the adhesive 430 can be a light curing adhesive.

In another embodiment, the adhesive 430 can be heated to solidify the adhesive 430, wherein the adhesive 430 can be a heat curing adhesive.

Accordingly, the adjustment of the display size is basically accomplished to form the size of the target display.

After the step S5 is accomplished, the related circuit can be connected to the circuit connection end. For the liquid crystal display, the backlight module can be adhered to the second reservation part 220 thereafter.

In this embodiment, because the orthographic projection of the first cutting line on the second substrate 200 does not overlap with the second cutting line, and the first substrate 100 and the image generating medium 300 are cut along the first cutting line to remove the first remove part 130 and the part of the image generating medium 300 corresponding to the first remove part 130 to form the first reservation part 120 and a part of the image generating medium, and the second substrate 200 is cut along the second cutting line to remove the second remove part 230 to form the second reservation part 220, and an edge of the first reservation part 120 at the first cutting line contract inwardly relative to an edge of the second reservation part 220 at the second cutting line so that the second reservation part 220 protrudes with a part to form a protruding part 240;

i.e. after the display is cut, the length of the second reservation part 220 is larger than the length of the first reservation part 120, and after cutting, the length of the second substrate 200 is larger than the length of the first substrate 100, and thus the protruding part 240 is formed on the second reservation part 220;

Thus, the adhesive 430 can be added on the surface of the protruding part 240 facing the first reservation part 120. Because the protruding part 240 and the second reservation part 220 are at the same plane, the adhesive 430 added on the surface of the protruding part 240 facing the first reservation part 120 can easily permeate between the first reservation part 120 and the second reservation part 220. Thereby, the adhesive can fully permeate between the first reservation part 120 and the second reservation part 220 to make the full seal between the first reservation part 120 and the second reservation part 220, and thus to avoid the phenomenon of the large coating location deviation and the adhesive break for preventing the poor seal issue caused by the large coating location deviation and the adhesive break.

In the description of the present specification, the reference terms, "one embodiment", "some embodiments", "an illustrative embodiment", "an example", "a specific example", or "some examples" mean that such description combined with the specific features of the described embodiments or examples, structure, material, or characteristic is included in the utility model of at least one embodiment or example. In the present specification, the terms of the above schematic representation do not certainly refer to the same embodiment or example. Meanwhile, the particular features, structures, materials, or characteristics which are described may be combined in a suitable manner in any one or more embodiments or examples.

Above are embodiments of the present invention, which does not limit the scope of the present invention. Any modifications, equivalent replacements or improvements within the spirit and principles of the embodiment described above should be covered by the protected scope of the invention.

What is claimed is:

1. A method of adjusting a display size, comprising steps of:
    providing a display, and the display comprises a first substrate, a second substrate and an image generating medium sealed by a first seal part and a second seal part between the first substrate and the second substrate;
    locating a first cutting line on the first substrate between the first seal part and the second seal part, and locating a second cutting line on the second substrate between the first seal part and the second seal part, and an orthographic projection of the first cutting line on the second substrate does not overlap with the second cutting line;
    cutting the first substrate and the image generating medium along the first cutting line to form a first reservation part and a part of the image generating medium corresponding to the first reservation part, and cutting the second substrate along the second cutting line to form a second reservation part stacked with the first reservation part, and an edge of the first reservation part at the first cutting line contract inwardly relative to an edge of the second reservation part at the second cutting line to form a protruding part at the edge of the second reservation part;
    adding adhesive on a surface of the protruding part facing the first reservation part to make the adhesive permeate between the first reservation part and the second reservation part; and
    solidifying the adhesive.

2. The method according to claim 1, wherein the step of making the adhesive permeate between the first reservation part and the second reservation part comprises:
    an edge of the adhesive permeating between the first reservation part and the second reservation part is distanced at least 0.1 millimeter from the edge of the first reservation part at the first cutting line.

3. The method according to claim 1, wherein a distance that the edge of the first reservation part at the first cutting line contract inwardly relative to the edge of the second reservation part at the second cutting line is in a range of 1 millimeter to 10 millimeter.

4. The method according to claim 1, wherein the step of adding adhesive on a surface of the protruding part facing the first reservation part to make the adhesive permeate between the first reservation part and the second reservation part comprises:
    adding the adhesive on the surface of the protruding part facing the first reservation part along the edge of the first reservation part at the first cutting line;
    increasing pressure on a surface of the adhesive to make the adhesive permeate between the first reservation part and the second reservation part.

5. The method according to claim 2, wherein the step of adding adhesive on a surface of the protruding part facing the first reservation part to make the adhesive permeate between the first reservation part and the second reservation part comprises:
    adding the adhesive on the surface of the protruding part facing the first reservation part along the edge of the first reservation part at the first cutting line;
    increasing pressure on a surface of the adhesive to make the adhesive permeate between the first reservation part and the second reservation part.

6. The method according to claim 3, wherein the step of adding adhesive on a surface of the protruding part facing the first reservation part to make the adhesive permeate between the first reservation part and the second reservation part comprises:
   adding the adhesive on the surface of the protruding part facing the first reservation part along the edge of the first reservation part at the first cutting line;
   increasing pressure on a surface of the adhesive to make the adhesive permeate between the first reservation part and the second reservation part.

7. The method according to claim 1, wherein the step of solidifying the adhesive comprises:
   employing ultraviolet light to irradiate the adhesive to solidify the adhesive, wherein the adhesive is a light curing adhesive.

8. The method according to claim 2, wherein the step of solidifying the adhesive comprises:
   employing ultraviolet light to irradiate the adhesive to solidify the adhesive, wherein the adhesive is a light curing adhesive.

9. The method according to claim 3, wherein the step of solidifying the adhesive comprises:
   employing ultraviolet light to irradiate the adhesive to solidify the adhesive, wherein the adhesive is a light curing adhesive.

10. The method according to claim 1, wherein the step of solidifying the adhesive comprises:
    heating the adhesive to solidify the adhesive, wherein the adhesive is a heat curing adhesive.

11. The method according to claim 2, wherein the step of solidifying the adhesive comprises:
    heating the adhesive to solidify the adhesive, wherein the adhesive is a heat curing adhesive.

12. The method according to claim 3, wherein the step of solidifying the adhesive comprises:
    heating the adhesive to solidify the adhesive, wherein the adhesive is a heat curing adhesive.

13. The method according to claim 1, wherein the first substrate is a thin film transistor array substrate, and the second substrate is a color filter component.

14. The method according to claim 2, wherein the first substrate is a thin film transistor array substrate, and the second substrate is a color filter component.

15. The method according to claim 1, wherein the first substrate is a color filter corn ponent, and the second substrate is a thin film transistor array substrate.

16. The method according to claim 2, wherein the first substrate is a color filter corn ponent, and the second substrate is a thin film transistor array substrate.

17. The method according to claim 3, wherein the first substrate is a color filter corn ponent, and the second substrate is a thin film transistor array substrate.

18. The method according to claim 15, wherein the image generating medium is liquid crystal.

19. The method according to claim 16, wherein the image generating medium is liquid crystal.

20. The method according to claim 17, wherein the image generating medium is liquid crystal.

* * * * *